(12) United States Patent
Nakagawa

(10) Patent No.: US 9,995,651 B2
(45) Date of Patent: Jun. 12, 2018

(54) LOAD APPLICATION DEVICE, LOAD MEASURING DEVICE, AND AIRCRAFT LOAD APPLICATION METHOD

(71) Applicant: Mitsubishi Aircraft Corporation, Aichi (JP)

(72) Inventor: Isamu Nakagawa, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 52 days.

(21) Appl. No.: 14/962,886

(22) Filed: Dec. 8, 2015

(65) Prior Publication Data

US 2016/0214740 A1    Jul. 28, 2016

(30) Foreign Application Priority Data

Jan. 23, 2015   (JP) .................................. 2015-10861

(51) Int. Cl.
*G01M 13/04*        (2006.01)
*B64F 5/60*         (2017.01)

(52) U.S. Cl.
CPC ............... *G01M 13/04* (2013.01); *B64F 5/60* (2017.01)

(58) Field of Classification Search
CPC ..... G01M 5/0016; G01M 5/0041; B64F 5/60; G01G 17/08; G01G 19/07
See application file for complete search history.

(56) References Cited

U.S. PATENT DOCUMENTS

| | | | | |
|---|---|---|---|---|
| 3,581,560 A | * | 6/1971 | Odier ........................ | G01L 5/28 73/116.01 |
| 4,064,955 A | * | 12/1977 | Dyck ........................ | G01G 5/04 177/134 |
| 4,385,527 A | * | 5/1983 | Raskin ................. | G01G 3/1408 177/146 |
| 4,463,816 A | * | 8/1984 | MacFarlane ........... | G01G 11/04 177/119 |
| 4,614,244 A | * | 9/1986 | Usagawa ............... | G01G 19/32 177/110 |
| 4,843,873 A | * | 7/1989 | Harald ...................... | G01L 5/16 73/147 |
| 4,889,202 A | * | 12/1989 | Bron ...................... | G01G 21/23 177/134 |

(Continued)

FOREIGN PATENT DOCUMENTS

JP        H02-203241 A      8/1990
JP        H06-160258 A      6/1994

*Primary Examiner* — Harshad R Patel
*Assistant Examiner* — Tran M Tran
(74) *Attorney, Agent, or Firm* — Pearne & Gordon LLP

(57) ABSTRACT

The present invention aims to apply a vertical load to a specimen with high precision even if the specimen shifts horizontally. A load application device includes: a hydraulic actuator which applies a load to a specimen; a support structural body which supports the hydraulic actuator along a vertical direction; a horizontal guide surface which guides the support structural body along a horizontal direction; and a bearing which is interposed between the support structural body and the horizontal guide surface and bears the support structural body so as to be horizontally shiftable relative to the horizontal guide surface. This bearing includes a plurality of spherical bodies supported so as to be independently rollable, and the plurality of spherical bodies are held in contact with the support structural body or the horizontal guide surface.

18 Claims, 8 Drawing Sheets

(56) References Cited

U.S. PATENT DOCUMENTS

| | | | | |
|---|---|---|---|---|
| 5,256,835 A * | 10/1993 | Rydzak | G01G 19/005 | 177/145 |
| 5,257,668 A * | 11/1993 | Sargent | G01G 3/1402 | 177/146 |
| 5,569,836 A * | 10/1996 | Hill | G01B 5/255 | 73/11.07 |
| 5,646,376 A * | 7/1997 | Kroll | B29C 47/025 | 177/136 |
| 5,652,411 A * | 7/1997 | Scrivener | G01G 3/1402 | 177/212 |
| 5,801,339 A * | 9/1998 | Boult | G01G 17/08 | 177/261 |
| 5,894,112 A * | 4/1999 | Kroll | G01G 19/02 | 177/134 |
| 6,177,638 B1 * | 1/2001 | Murray | F16H 7/08 | 177/133 |
| 6,433,289 B1 * | 8/2002 | Gurr | G01G 21/06 | 177/238 |
| 6,619,127 B2 * | 9/2003 | Miller | G01M 7/00 | 244/114 R |
| 7,294,793 B2 * | 11/2007 | Axakov | B60N 2/002 | 177/164 |
| 7,777,871 B2 * | 8/2010 | McNamara | G01B 7/12 | 356/72 |
| 8,648,267 B2 * | 2/2014 | Honda | G01G 21/23 | 177/211 |
| 8,839,675 B2 * | 9/2014 | Miller | G01G 19/07 | 177/146 |
| 8,887,581 B2 * | 11/2014 | Zaaijer | F16C 19/522 | 73/862.041 |
| 8,907,232 B2 * | 12/2014 | Naito | G01G 3/16 | 177/187 |
| 9,116,033 B2 * | 8/2015 | Lin | G01G 19/02 | |
| 9,423,289 B2 * | 8/2016 | Johnson | G01G 3/14 | |
| 2011/0127091 A1 * | 6/2011 | Shepherdson | G01G 3/08 | 177/211 |
| 2012/0085586 A1 * | 4/2012 | Naito | G01G 3/16 | 177/187 |
| 2013/0220709 A1 * | 8/2013 | Trakhimovich | G01G 19/024 | 177/134 |
| 2014/0013862 A1 * | 1/2014 | Lind | G01L 1/205 | 73/862.042 |

* cited by examiner

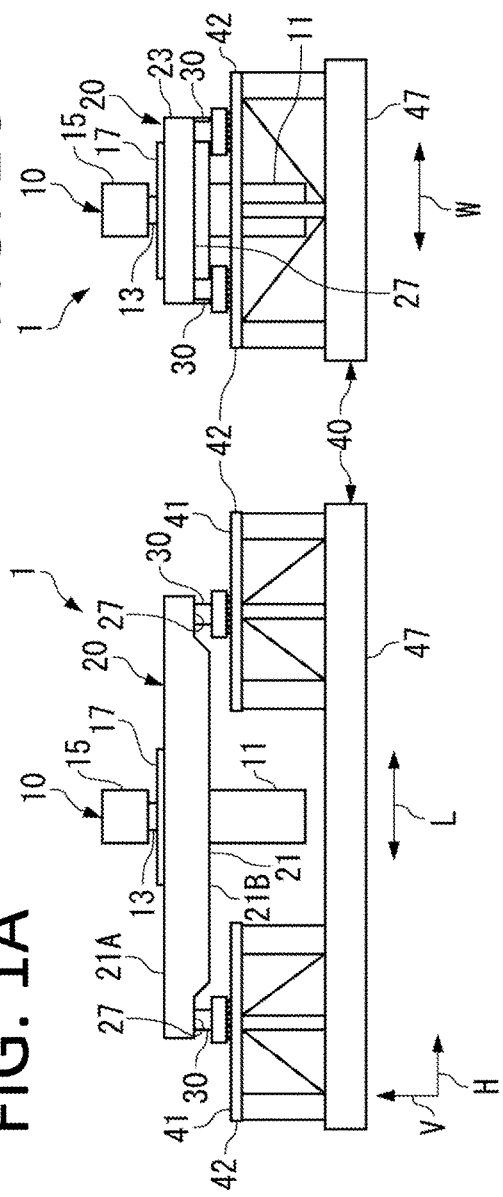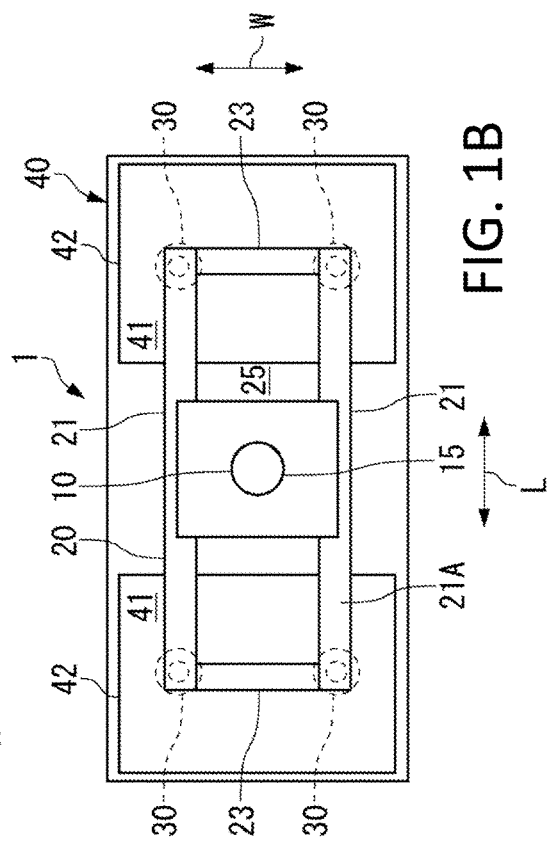

FIG. 4A
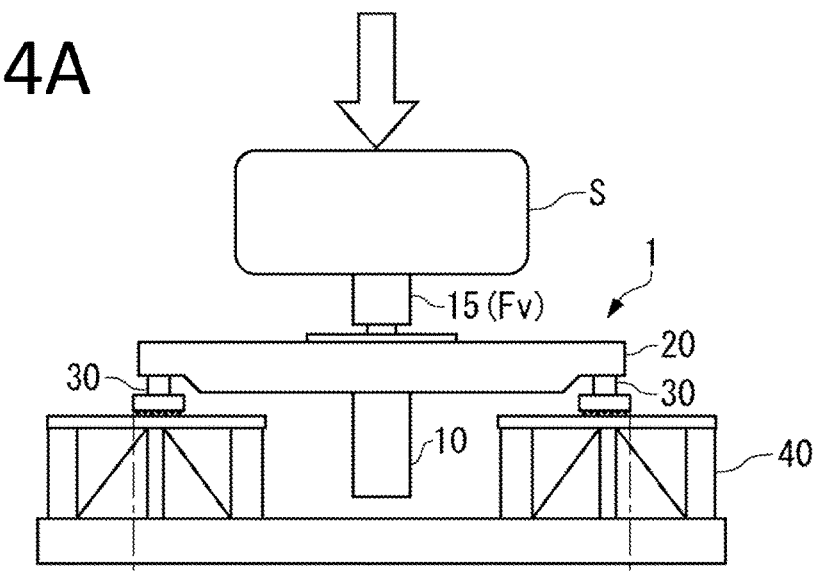
FIG. 4B
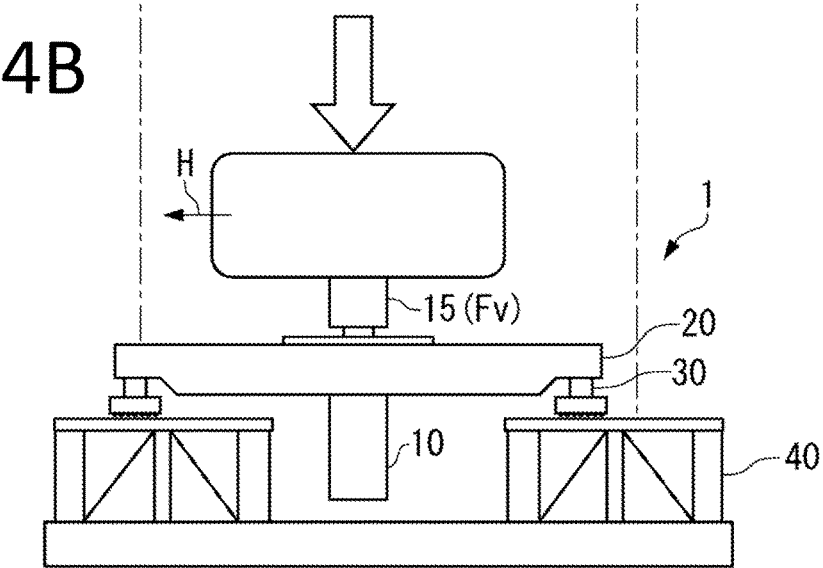

FIG. 8A
FIG. 8B
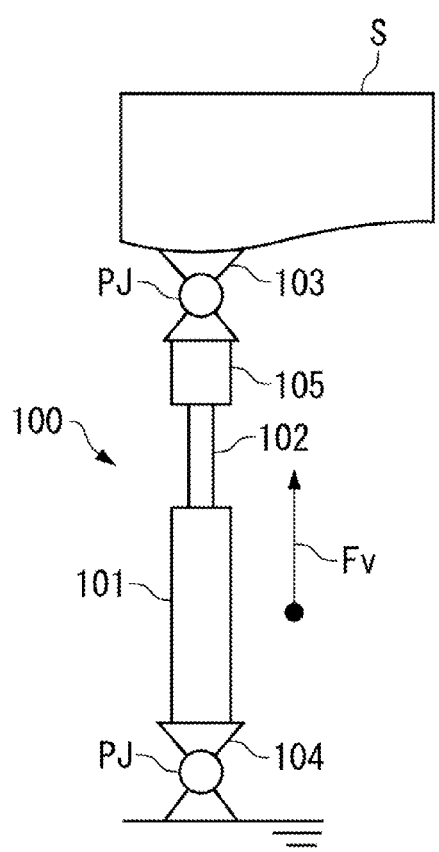
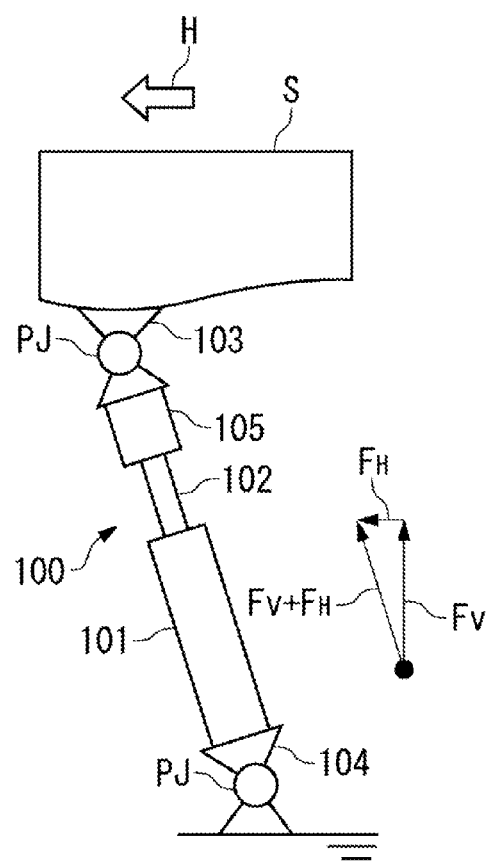

LOAD APPLICATION DEVICE, LOAD MEASURING DEVICE, AND AIRCRAFT LOAD APPLICATION METHOD

BACKGROUND OF THE INVENTION

Field of the Invention

The present invention relates to a device which vertically applies a load to a specimen.

Description of the Related Art

Devices which vertically apply a load to a specimen support the specimen by a universal joint, or support the specimen by a combination of a spherical seat and a spherical seat receiver, to eliminate the influence of a load eccentric to the vertical direction (e.g., Japanese Patent Application Laid-Open No. 2-203241 and Japanese Patent Application Laid-Open No. 6-160258).

As long as the specimen to which a load is to be applied shifts or deforms under a load only in the vertical direction, a reasonably accurate measurement result can be obtained if the specimen is supported by a universal joint, or a pin joint of a combination of a spherical seat and a spherical seat receiver.

However, in a case where the specimen shifts horizontally, a pin joint alone cannot allow accurate application of a vertical load as will be described below. Unless the specimen is restrained from shifting horizontally, the specimen can shift horizontally during a load test. For example, a horizontal shift can occur when a vertical load is applied to the specimen while the specimen is held in suspension.

As shown in FIG. 8A, a test device 100, which applies a vertical load $F_V$ to a specimen S, includes a hydraulic actuator 101, support members 103, 104 supporting the hydraulic actuator 101 respectively on an upper part and a lower part of the hydraulic actuator 101, and a load cell 105 interposed between the upper support member 103 and a piston rod 102 of the hydraulic actuator 101. The support members 103, 104 each include a pin joint part PJ. If the specimen S shifts in a horizontal direction H as shown in FIG. 8B while a vertical load is being applied by the test device 100, a horizontal load $F_H$, in addition to the vertical load $F_V$, occurs on the hydraulic actuator 101. Accordingly, a load combining the vertical load $F_V$ and the horizontal load $F_H$ occurs on the specimen S, so that it is not possible to accurately apply only the vertical load $F_V$ to the specimen S.

Therefore, an object of the present invention is to provide a load application device which, even if a specimen shifts horizontally, can accurately apply only the vertical load that is to be imposed on the specimen.

Another object of the present invention is to provide an aircraft load application method which uses such a load application device and can accurately apply only the vertical load that is to be imposed on the airframe of an aircraft.

SUMMARY OF THE INVENTION

To achieve these objects, a load application device of the present invention includes: an actuator which imposes a load on a specimen; a support structural body which supports the actuator along a vertical direction; a horizontal guide surface which guides the support structural body along a horizontal direction; and a bearing which is interposed between the support structural body and the horizontal guide surface and bears the support structural body so as to be horizontally shiftable relative to the horizontal guide surface. The bearing of the present invention includes a plurality of rolling elements supported so as to be independently rollable, and these rolling elements are held in contact with the support structural body or the horizontal guide surface.

In the load application device of the present invention, the bearing includes the rolling elements having low frictional resistance, and the support structural body can shift horizontally relative to the horizontal guide surface through these rolling elements. Therefore, even if the specimen shifts horizontally while a vertical load on the specimen is being measured, the support structural body supporting the actuator shifts easily following the shift of the specimen, so that no horizontal load or only a minute horizontal load, if any, occurs on the specimen.

In the load application device of the present invention, a vertical load acts stably on the specimen, since the actuator is vertically supported by the support structural body and, even if the support structural body shifts horizontally, the actuator does not incline from the vertical direction.

Therefore, according to the load application device of the present invention, it is possible to apply only the vertical load to a specimen with high precision even if the specimen shifts horizontally.

The load application device of the present invention has two forms in terms of where the bearing is provided. In one form (first form), the bearing is provided on the side of the support structural body, and in the other form (second form), the bearing is provided on the side of the horizontal guide surface.

In the first form, the rolling elements are in contact with the horizontal guide surface, and the support structural body shifts horizontally with the bearing along the horizontal guide surface. In the second form, the rolling elements are in contact with the support structural body, and the support structural body shifts horizontally following the bearing provided on the horizontal guide surface.

The present invention can adopt either of the first form and the second form, and in both forms the support structural body supporting the actuator is functionally equivalent in shifting so as to follow a shift of the specimen. However, provided that the support structural body shifts in the same amount, while the second form requires the rolling elements to be provided over the entire area of shift, the first form requires the rolling elements to be provided only over an area smaller than the area of shift, which offers an advantage that the bearing can be downsized.

The load application device of the present invention can handle not only the case where the horizontal shift of the specimen occurs only in a certain direction but also the case where the horizontal shift occurs in an arbitrary direction.

When the shift is limited to a certain direction, rollers can be used as the rolling elements. The plurality of rollers should be arranged in a row in a direction orthogonal to the rotating shafts, and the bearing should be disposed along that certain direction.

When the shift occurs in an arbitrary direction, spherical bodies can be used as the rolling elements, and the plurality of spherical bodies should preferably be supported so as to be rollable in an arbitrary direction. Thus, frictional resistance can be reduced when the support structural body supporting the actuator shifts horizontally following the shift of the specimen in whichever horizontal direction. From this viewpoint, it is more preferable that the plurality of spherical bodies are disposed radially.

In the load application device of the present invention, it is preferable that the bearings are disposed on both sides across a position, where the hydraulic actuator is supported, in main directions in which a horizontal shift of the support structural body occurs, and it is more preferable that four bearings are provided at point-symmetrical positions with the center of symmetry at the position where the actuator is supported. In addition, the support structural body can support the hydraulic actuator more stably by supporting the hydraulic actuator at the middle of its height.

In the load application device of the present invention, the horizontal guide surface can be provided at a level elevated by a predetermined distance. Thus, it is possible to prevent the actuator from interfering with the base part of the device or the ground in the vertical direction.

While the load application device of the present invention can be applied for arbitrary purposes, the present invention is preferably applied to the airframe of an aircraft as the specimen. In a load test of an aircraft, the airframe is prone to shift horizontally as a load is vertically imposed on the airframe in a suspended state. If the load application device of the present invention is used, it is possible to apply only the vertical load with high precision while keeping the horizontal load to a minute amount.

According to the load application device of the present invention, it is possible to apply only the vertical load to a specimen with high precision even if the specimen shifts horizontally.

BRIEF DESCRIPTION OF THE DRAWINGS

FIGS. 1A, 1B and 1C are views each showing a load application device in an embodiment, in which FIG. 1A is a side view, FIG. 1B is a plan view, and FIG. 1C is a front view;

FIGS. 2A, 2B and 2C are views each separately showing components of the load application device of FIGS. 1A to 1C, in which FIG. 2A shows a support structural body which supports a hydraulic actuator, FIG. 2B shows a mount including a horizontal guide surface, and FIG. 2C shows a bearing;

FIGS. 3A, 3B and 3C are views each showing a bearing used in the load application device of FIGS. 1A to 1C, in which FIG. 3A is a side view, FIG. 3B is a plan view, and FIG. 3C is a back view;

FIGS. 4A and 4B are views each showing a state where a vertical load from a specimen S is measured using the load application device of FIGS. 1A to 1C, in which FIG. 4A shows a state where no horizontal shift is occurring, and FIG. 4B shows a state where a horizontal shift in a longitudinal direction is occurring;

FIGS. 5A and 5B are views each showing a state where a vertical load from the specimen S is measured using the load application device of FIGS. 1A to 1C, in which FIG. 5A shows a state where no horizontal shift is occurring, and FIG. 5B shows a state where a horizontal shift in a width direction is occurring;

FIGS. 8A and 8B are views showing that a horizontal load is caused by a conventional load application device.

DETAILED DESCRIPTION OF THE PREFERRED EMBODIMENTS

Figure 2A:
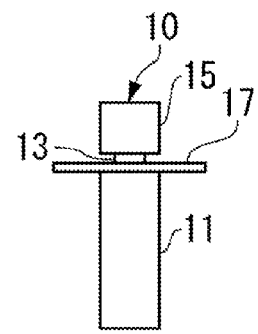
Figure 2B:
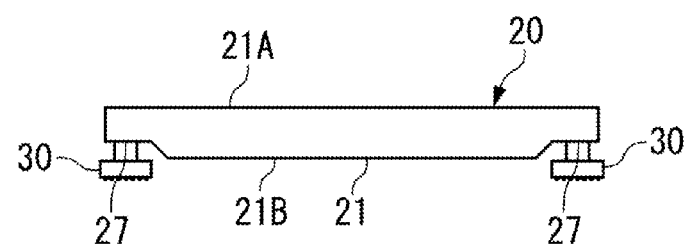
Figure 2C:
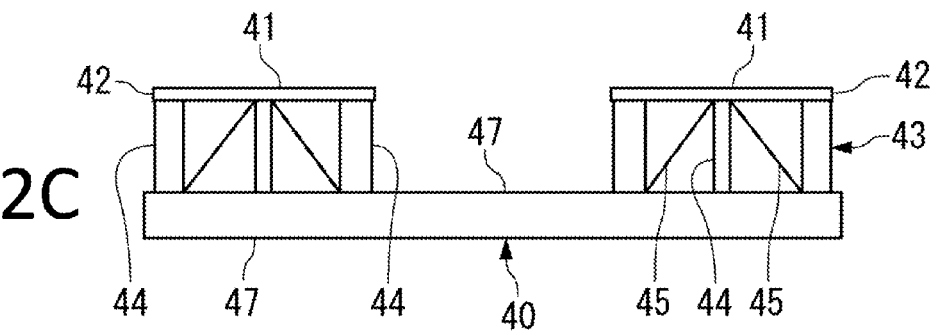

In the following, the present invention will be described on the basis of an embodiment shown in the accompanying drawings.

A load application device 1 in this embodiment applies only a vertical load $F_V$ to a specimen S, and aims to apply only the vertical load $F_V$ with high precision while eliminating the influence of a horizontal load $F_H$ as far as possible even if the specimen S shifts horizontally.

The configuration of the load application device 1 will be described below with reference to FIGS. 1A to 3C.

The load application device 1 includes a hydraulic actuator 10, a support structural body 20 supporting the hydraulic actuator 10, bearings 30 provided on the support structural body 20, and a mount 40 having horizontal guide surfaces 41 which guide the support structural body 20 along the horizontal direction through the bearings 30. While the hydraulic actuator 10 is used here, an electrically-driven actuator or a pneumatically-driven actuator can also be used.

The hydraulic actuator 10 includes a cylinder 11, a piston rod 13, a load cell 15, and a flange 17.

The cylinder 11 has a tubular cavity provided inside for housing hydraulic oil, and a piston (not shown) of the piston rod 13 is disposed in this cavity. The load cell 15 is fixed at the upper end of the piston rod 13 and supports the specimen S (see FIGS. 4A to 5B) to measure the vertical load $F_V$ imposed on the specimen S.

The flange 17 is provided so as to project toward the outer circumference of the cylinder 11, and serves to support the hydraulic actuator 10 on the support structural body 20.

Next, as shown in FIGS. 1A to 2C, the support structural body 20 is formed in a frame shape by combining support beams 21, 21 disposed at a predetermined interval in a width direction W and coupling members 23, 23 connecting the ends of the support beams 21, 21 with each other. The rigidity of the support structural body 20 is secured so that the support structural body 20 does not deform under a reaction force from the specimen S. The same applies to the bearings 30 and the mount 40 to be described later.

The support structural body 20 has an upper surface 21A and a lower surface 21B. In a plan view, the region surrounded by the pair of support beams 21, 21 and the pair of coupling members 23, 23 forms an actuator housing space 25 which penetrates the upper surface 21A and the lower surface 21B. The hydraulic actuator 10 penetrates the actuator housing space 25 and is supported on the support structural body 20. That is, the bearings 30 are disposed on the left and right sides across the position, where the hydraulic actuator 10 is supported, in a longitudinal direction L and the width direction W in which a horizontal shift of the support structural body 20 can occur.

The support structural body 20 is provided with bearing fixing portions 27, on which the bearings 30 are fixed. The bearing fixing portions 27 are provided in the lower surface 21B of the support beams 21, 21 at their both ends so as to be depressed toward the upper surface 21A. The bearing fixing portions 27 are provided continuously in the width direction W.

Figure 3A:
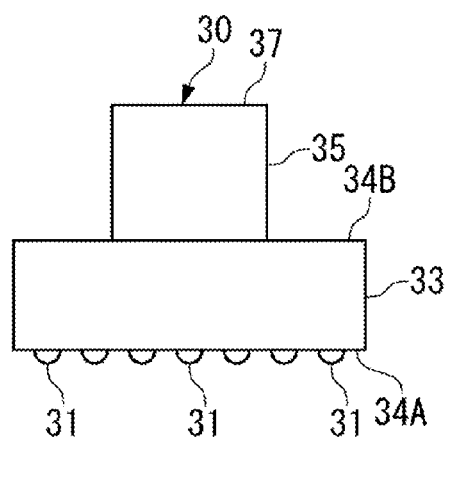
Figure 3C:
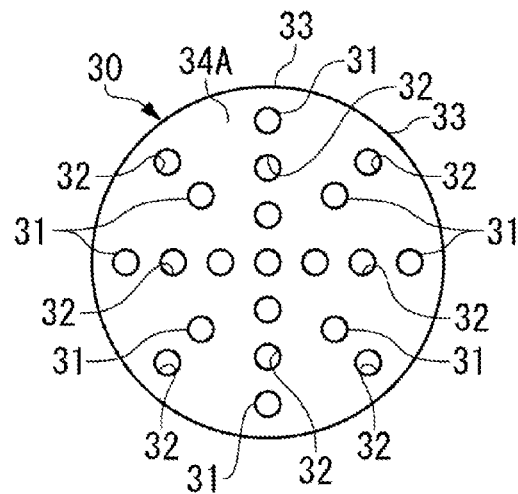
Figure 3B:
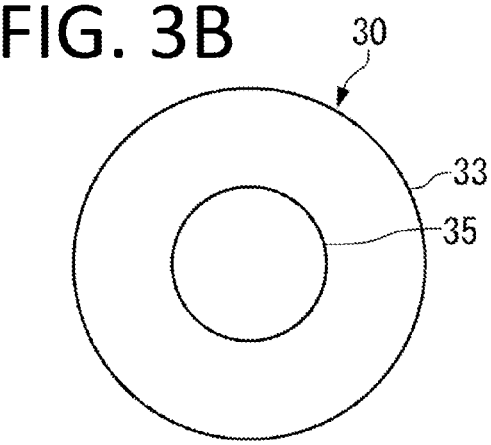

Next, as shown in FIGS. 3A to 3C, the bearings 30 are of a type which uses spherical bodies 31 as rolling elements, and each bearing 30 includes the plurality of spherical bodies 31, a support 33 with housing concaves 32, which house the spherical bodies 31 so as to be independently rollable, formed therein, and a load transmission shaft 35 provided in the support 33.

The cylindrical support 33 has a front surface 34A in which the housing concaves 32 are formed, and a rear surface 34B which is the opposite side from the front surface 34A. The spherical bodies 31 are provided on the side of the front surface 34A, and the load transmission shaft 35 is provided on the side of the rear surface 34B. The bearing 30 is disposed so that the side of the front surface 34A faces the mount 40 and the side of the rear surface 34B faces the support structural body 20.

The bearing 30 has the plurality of housing concaves 32 provided radially on the side of the front surface 34A. In each of the housing concaves 32, an about half portion of one spherical body 31 is housed, while the remaining about half portion is exposed to the outside from the front surface 34A. The plurality of spherical bodies 31 are disposed radially, and those portions of the spherical bodies 31 that are exposed from the front surface 34A are in contact with the horizontal guide surface 41 of the mount 40 to be described later.

As long as the spherical bodies 31 are rollable with low resistance, the structure for holding the spherical bodies 31 in the housing concaves 32 is arbitrary, and publicly-known means can be adopted appropriately.

As a leading end 37 of the load transmission shaft 35 is fixed on the bearing fixing portion 27, the bearing 30 can shift integrally with the support structural body 20.

Next, as shown in FIGS. 1A to 2C, the mount 40 includes: guide plates 42 provided at a predetermined interval in the longitudinal direction L of the load application device 1 and each having the horizontal guide surface 41; a support structure 43 constituted of a pillar 44 supporting the guide plate 42 and a diagonal brace 45; and a plate-shaped base 47 on which the lower end side of the support structure 43 is fixed.

The mount 40 is disposed so that the horizontal guide surfaces 41 of the guide plates 42 face upward and extend along the horizontal direction, and supports two bearings 30 on one horizontal guide surface 41 and supports the other two bearings 30 on the other horizontal guide surface 41. Thus, the support structural body 20 has a beam structure supported at both ends which is restrained from shifting in a vertical direction V but is allowed to shift in the horizontal direction H. Although the hydraulic actuator 10 supported by the support structural body 20 penetrates the actuator housing space 25 and protrudes downward from the lower surface 21B, since the protrusion is between the support structures 43, 43, the hydraulic actuator 10 does not interfere with the mount 40. Since the horizontal guide surfaces 41 are provided at a level elevated from the base 47 by a predetermined distance, the cylinder 11 of the hydraulic actuator 10 can be prevented from interfering with the base 47.

Optionally, a partition for restricting the amount of shift of the support structural body 20 may be provided along the peripheral edges of the horizontal guide surfaces 41.

Next, the operation of the load application device 1 when the vertical load $F_V$ is applied to the specimen S using the load application device 1 will be described with reference to FIGS. 4A to 5B.

As shown in FIG. 4A, when the vertical load indicated by the outlined arrow is imposed on the specimen S by the hydraulic actuator 10 supported by the support structural body 20, the vertical load $F_V$ is measured by the load cell 15. As shown in FIG. 4A, if the specimen S is under strictly only the vertical load, the support structural body 20 supporting the hydraulic actuator 10 remains in its initial position. However, the load actually imposed as a vertical load can deviate from the vertical direction, and if the specimen S is not restrained from shifting horizontally, the specimen S can shift horizontally. FIG. 4B shows an example where the specimen S has shifted in the longitudinal direction L. The load application device 1 has the bearings 30 provided between the support structural body 20 and the mount 40.

Accordingly, when the support structural body 20, following the shift of the specimen S, shifts along the horizontal guide surfaces 41 from its initial position relative to the mount 40, the spherical bodies 31 of the bearings 30 roll on the horizontal guide surfaces 41 of the mount 40, so that the resistance due to friction between the bearings 30 and the mount 40 is low, and no horizontal load $F_H$ or only a minute horizontal load $F_H$, if any, is imposed on the specimen S. Moreover, the vertical load acts stably on the specimen S, since the load application device 1 vertically supports the hydraulic actuator 10 by the support structural body 20 and, even if the support structural body 20 shifts horizontally, the hydraulic actuator 10 does not incline from the vertical direction.

Therefore, according to the load application device 1 of this embodiment, it is possible to apply only the vertical load $F_V$ through the hydraulic actuator 10 with high precision even if the specimen S shifts horizontally.

The load application device 1 has the bearings 30 disposed on the left and right sides across the position, where the support structural body 20 supports the hydraulic actuator 10, in the directions in which a horizontal shift of the support structural body 20 can occur. In particular, the load application device 1 has four bearings 30 disposed at point-symmetrical positions with the center of symmetry at the position where the hydraulic actuator 10 is supported. Thus, the hydraulic actuator 10 is supported more stably, which makes it possible to apply only the vertical load $F_V$ with high precision.

Figure 5A:
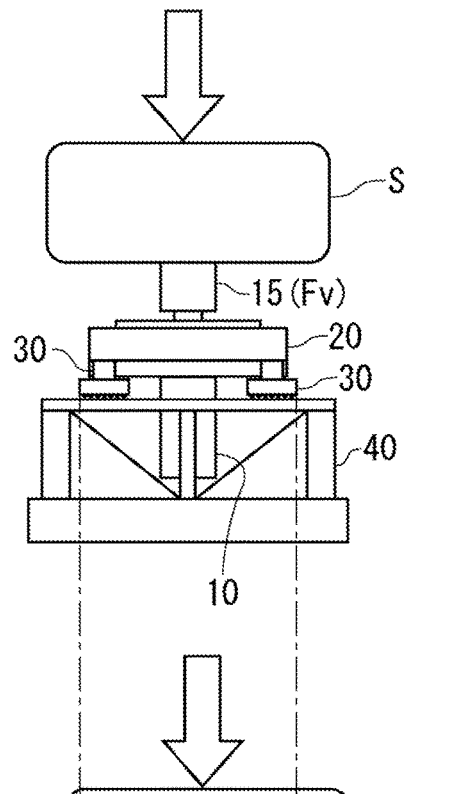
Figure 5B:
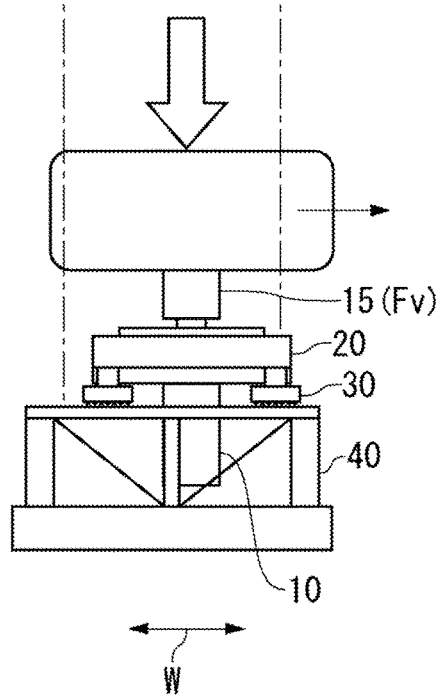

While the example where the support structural body 20 supporting the hydraulic actuator 10 shifts in the longitudinal direction L is shown in FIGS. 4A and 4B, the bearings 30 of this embodiment include the spherical bodies 31 as the rolling elements. Therefore, as shown in FIGS. 5A and 5B, even if the specimen S shifts in the width direction W, the support structural body 20 can shift easily in the width direction W following the shift of the specimen S, which makes it possible to apply only the vertical load $F_V$ with high precision.

While the cases of shifts in the longitudinal direction L and the width direction W have been described here as the most typical examples, the support structural body 20 can shift easily in an arbitrary horizontal direction since the spherical bodies 31 are used.

Figure 6:
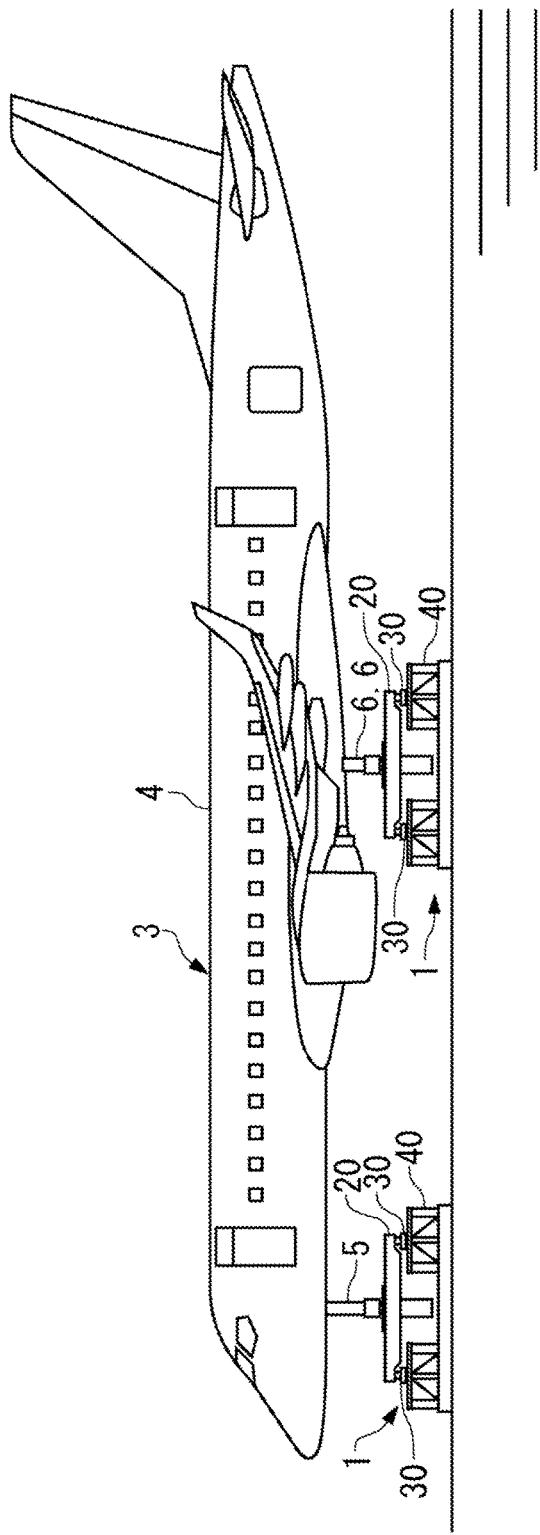
FIG. 6 is a view showing a state where a vertical load acting on an airframe of an aircraft is measured using the load application device in the embodiment.

Among arbitrary purposes for which the load application device 1 of this embodiment is applied, one example is a strength test of the airframe of an aircraft. As shown in FIG. 6, this strength test of an aircraft is performed using a strength test airframe 3 which is a mock-up of the actual airframe. To reproduce a state of flight, the airframe 3 is suspended on wires attached at a plurality of positions thereof. Accordingly, since the airframe 3 is not restrained from shifting horizontally, any attempt to impose only the vertical load on the airframe 3 results in a horizontal shift of the airframe 3.

As shown in FIG. 6, the strength test is performed with the load application devices 1 supporting the airframe 3 respectively at total three points: a nose landing gear 5 provided on the front side of a fuselage 4, and left and right main landing gears 6, 6 provided in a center part of the fuselage 4. Neither the nose landing gear 5 nor the left and right main landing gears 6, 6 have wheels mounted therein.

A vertical load is imposed at the positions of the airframe 3 while the airframe 3 is supported at three points, and the vertical load $F_V$ is applied in the respective load application devices 1. That is, the hydraulic actuators 10 of the load application devices 1 are respectively mock-ups of these landing gears of the aircraft. Although the airframe 3 can shift in an arbitrary horizontal direction, the vertical load $F_V$ is applied with high precision owing to the bearings 30 interposed between the support structural body 20 and the mount 40.

Having been thus described on the basis of the preferred embodiment, the present invention is not limited to this embodiment. The configurations presented in the above embodiment can be selectively adopted or appropriately modified into other configurations within the scope of the present invention.

Figure 7A:
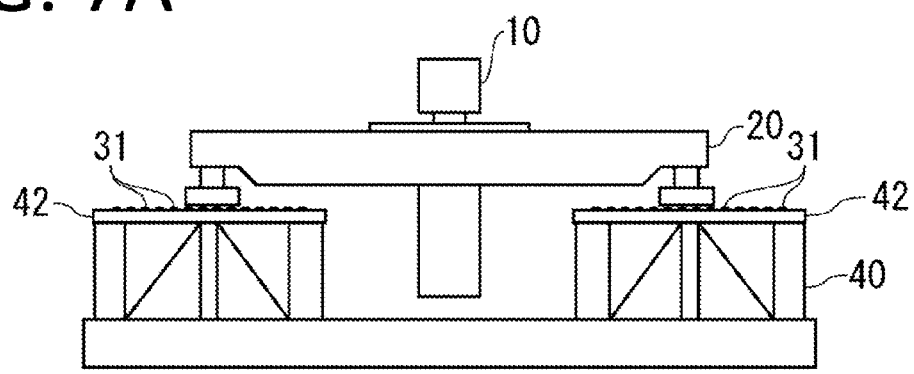
FIGS. 7A and 7B are views each showing a modified example of the embodiment.

For example, the load application device 1 has the bearings 30 provided on the side of the support structural body 20, but the bearings 30 can instead be provided on the side of the mount 40 as long as the support structural body 20 can shift horizontally relative to the mount 40. That is, as shown in FIG. 7A, the guide plate 42 can function as the bearing 30 if the plurality of spherical bodies 31 are rollably supported on the guide plate 42 of the mount 40. In this case, too, the support structural body 20 shifts horizontally along the horizontal guide surface 41, and the support structural body 20 can shift easy through the spherical bodies 31.

Here, provided that the support structural body 20 shifts in the same amount, while the form shown in FIG. 7A requires the spherical bodies 31 to be provided over the entire area of shift, the above-described form requires the spherical bodies 31 to be provided only over an area smaller than the area of shift, which offers an advantage that the bearing 30 can be downsized.

On the other hand, in a case where the support structural body 20 shifts repeatedly over a large area, the form of FIG. 7A is advantageous in that the spherical bodies 31 wear less.

Figure 7B:
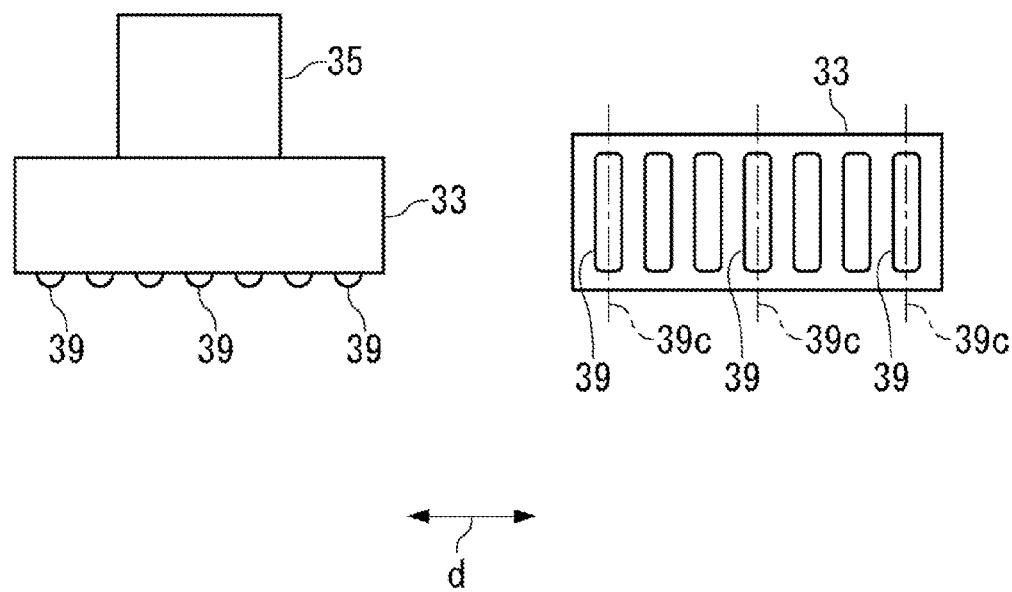

While the load application device 1 employs the spherical bodies 31 as the rolling elements, if the direction in which the specimen S shifts horizontally is specified, a plurality of circular columnar rollers 39 can be used as the rolling elements as shown in FIG. 7B. In this case, resistance due to friction can be kept low if the rollers 39 are supported by the support 33 so that rotating shafts 39C of the rollers 39 are orthogonal to a certain direction of shift d.

Otherwise, the configurations of the hydraulic actuator 10, the support structural body 20, the bearing 30, and the mount 40 constituting the load application device 1 are mere examples, and the structure of the load application device 1 can be modified according to the test conditions.

What is claimed is:

1. A load application device comprising:
   an actuator configured to impose a vertical load on a specimen, wherein the specimen is located directly above the actuator;
   a support structural body configured to support the actuator along a vertical direction, wherein the support structural body comprises an upper surface and a lower surface, and wherein a portion of the actuator is positioned vertically above the upper surface;
   a horizontal guide surface configured to guide the support structural body along a horizontal direction, wherein the horizontal guide surface is located directly below the support structural body; and
   a bearing
   comprising a first end and a second end, wherein the first end is coupled to the lower surface of the support structural body,
   wherein the second end includes a plurality of independent rolling elements supported by the second end so as to be independently rollable, and wherein the plurality of rolling elements are held in contact with the horizontal guide surface such that the support structural body shifts with the bearing along the horizontal guide surface.

2. The load application device according to claim 1, wherein the bearing employs spherical bodies as the rolling elements, and supports the plurality of spherical bodies so as to be rollable in an arbitrary direction.

3. The load application device according to claim 2, wherein the plurality of spherical bodies are disposed radially.

4. The load application device according to claim 1, wherein at least two bearings are provided on both sides across a position, where the actuator is supported, in main directions in which a horizontal shift of the support structural body occurs.

5. The load application device according to claim 1, wherein four bearings are provided at point-symmetrical positions with the center of symmetry at the position where the actuator is supported.

6. The load application device according to claim 1, wherein the bearing is fixed on a bearing fixing portion provided in the support structural body.

7. The load application device according to claim 1, wherein:
   the actuator penetrates the upper surface and the lower surface and is supported on the support structural body.

8. The load application device according to claim 1, wherein the horizontal guide surface is provided at a level elevated by a predetermined distance.

9. The load application device according to claim 1, wherein the actuator is a mock-up of a landing gear of an airframe of an aircraft.

10. A load measuring device comprising:
    a load application device according to claim 1; and
    load measuring equipment for measuring a vertical reaction force from the specimen.

11. An aircraft load application method in which a vertical load to be imposed on an airframe of an aircraft is applied while a plurality of landing gears of the airframe are each supported by a single load application device according to claim 1.

12. The load application device according to claim 1, wherein the actuator is a hydraulic actuator comprising a cylinder and a piston rod.

13. A load application device comprising:
    an actuator configured to impose a vertical load on a specimen, wherein the specimen is located directly above the actuator;
    a support structural body configured to support the actuator along a vertical direction, wherein the support structural body comprises an upper surface and a lower surface, and wherein a portion of the actuator is positioned vertically above the upper surface;
    a horizontal guide surface configured to guide the support structural body along a horizontal direction, wherein the horizontal guide surface is located directly below the support structural body; and
    a bearing comprising a first end and a second end, wherein the first end is coupled to the lower surface of the support structural body,
    wherein the horizontal guide surface includes a plurality of independent rolling elements supported thereon so as to be independently rollable, and wherein the plurality of rolling elements are held in contact with the second end of the bearing such that the support structural body shifts with the bearing along the horizontal guide surface.

14. The load application device according to claim 13, wherein the actuator penetrates the upper surface and the lower surface and is supported on the support structural body.

15. The load application device according to claim 13, wherein the actuator is a mock-up of a landing gear of an airframe of an aircraft.

16. A load measuring device comprising:
   a load application device according to claim 13; and
   load measuring equipment for measuring a vertical reaction force from the specimen.

17. An aircraft load application method in which a vertical load to be imposed on an airframe of an aircraft is applied while a plurality of landing gears of the airframe are each supported by a single load application device according to claim 13.

18. The load application device according to claim 13, wherein the actuator is a hydraulic actuator comprising a cylinder and a piston rod.

\* \* \* \* \*